United States Patent
Kuhara et al.

(10) Patent No.: US 10,885,406 B2
(45) Date of Patent: Jan. 5, 2021

(54) THERMAL PRINTER AND PRINTING METHOD HAVING EXTENDED IMAGE DATA IN A FEEDING DIRECTION

(71) Applicant: Mitsubishi Electric Corporation, Tokyo (JP)

(72) Inventors: Atsuko Kuhara, Tokyo (JP); Shiohiro Okinaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/634,829

(22) PCT Filed: Mar. 26, 2019

(86) PCT No.: PCT/JP2019/012806
§ 371 (c)(1),
(2) Date: Jan. 28, 2020

(87) PCT Pub. No.: WO2020/194499
PCT Pub. Date: Oct. 1, 2020

(65) Prior Publication Data
US 2020/0311495 A1    Oct. 1, 2020

(51) Int. Cl.
*G06K 15/00* (2006.01)
*G06K 15/02* (2006.01)

(52) U.S. Cl.
CPC ....... *G06K 15/028* (2013.01); *G06K 15/1873* (2013.01)

(58) Field of Classification Search
CPC .......... G06K 15/028; G06K 15/1873
See application file for complete search history.

(56) References Cited

U.S. PATENT DOCUMENTS

| | | | |
|---|---|---|---|
| 4,376,942 A | 3/1983 | Toth et al. | |
| 2004/0133408 A1* | 7/2004 | Verdyck | B41J 2/36 703/2 |

(Continued)

FOREIGN PATENT DOCUMENTS

| | | | |
|---|---|---|---|
| JP | 60-42072 A | 3/1985 | |
| JP | 5-261958 A | 10/1993 | |

(Continued)

OTHER PUBLICATIONS

International Search Report for PCT/JP2019/012806 dated May 14, 2019.

*Primary Examiner* — Juan M Guillermety
(74) *Attorney, Agent, or Firm* — Birch, Stewart, Kolasch & Birch, LLP

(57) ABSTRACT

Provided is a thermal printer achieving high repeatability of one dot even in an image having a large change in a density and capable of printing a printing material having high sharpness. A thermal printer includes: an image data extension processing unit generating extended image data having pixels in which the number of pixels in a feed direction of a paper sheet is extended; a printing data correction processing unit correcting a density of at least one extended pixel based on a change in a density of the extended pixels in the extended image data in the feed direction or a change in a density of pixels in the image data before extended in the feed direction; and a printing unit printing the image on the paper sheet based on the extended image data in which the density of the at least one extended pixel is corrected.

3 Claims, 16 Drawing Sheets

(56) References Cited

U.S. PATENT DOCUMENTS

2012/0133720 A1     5/2012  Sato
2015/0334319 A1 *  11/2015  Ohara .................... H04N 5/217
                                                          348/241

FOREIGN PATENT DOCUMENTS

| JP | 7-237314 A    | 9/1995 |
| JP | 8-197769 A    | 8/1996 |
| JP | 2004-223746 A | 8/2004 |
| JP | 2006-56150 A  | 3/2006 |
| JP | 2009-28967 A  | 2/2009 |
| JP | 2012-116083 A | 6/2012 |

* cited by examiner

F I G. 1
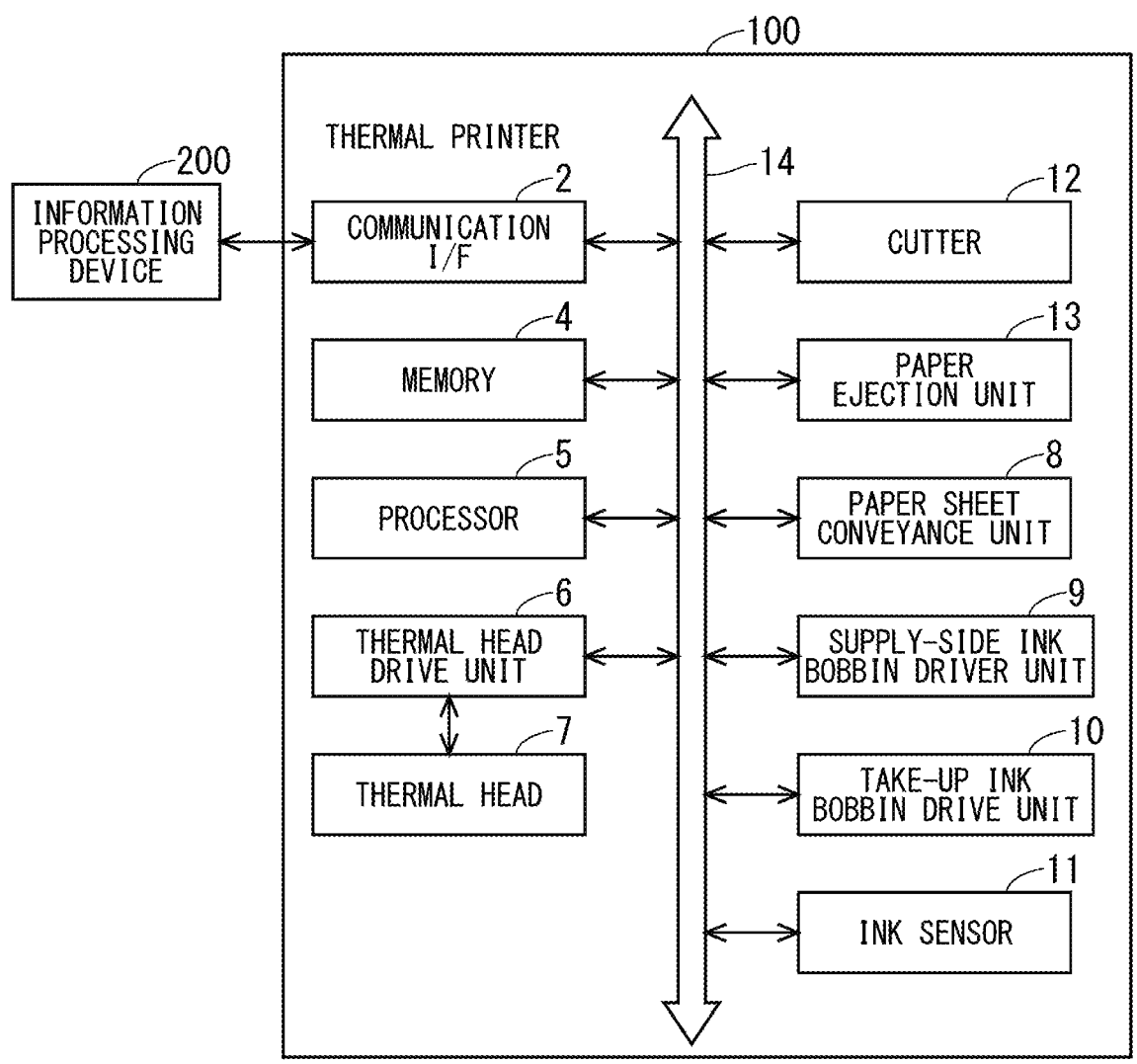

THERMAL PRINTER AND PRINTING METHOD HAVING EXTENDED IMAGE DATA IN A FEEDING DIRECTION

TECHNICAL FIELD

The present invention relates to a thermal printer and a printing method.

BACKGROUND ART

A thermal printer heats an ink seat by a thermal head and thermally transfers ink to a paper sheet, thereby performing printing. When a color printing is performed, the thermal printer thermally transfers different colors of ink of yellow (Y), magenta (M), and cyan (C) overlapped in this order to a paper sheet. The thermal printer controls a heating amount of the thermal head at the time of thermal transfer, thereby expressing a gradation of an image. Heater elements are linearly disposed (in a straight line) in the thermal head used in the thermal printer. The thermal printer performs printing for each line while supplying a paper sheet to the thermal head. That is to say, the thermal printer controls the heating amount of the heater elements for each line, and prints the image on the paper sheet.

In a printing method of controlling the heating amount in each line by energization pulse, when the heat is concentrated in one line or when the heat is continuously applied to the plurality of lines, a thermal damage is accumulated in the ink sheet. When the printing is performed using such an ink sheet in which the damage is accumulated, a printing defect or a peeling defect of the ink occurs, and a printing quality decreases. The heating amount of the heater element is small in the printing having a gradation with low density, thus an uneven development of the ink significantly occurs depending on a distribution of a density of the energization pulse. A gap between the lines occurring as a consequence causes a printing unevenness, so that the printing quality is deteriorated.

A thermal printer described in Patent Document 1 divides energization pulse rows for heating a thermal head into a plurality of groups in accordance with a density of image data to perform printing.

PRIOR ART DOCUMENTS

Patent Documents

Patent Document 1: Japanese Patent Application Laid-Open No. 8-197769

SUMMARY

Problem to be Solved by the Invention

The thermal printer described in Patent Document 1 divides the energization pulse rows for printing one line into the plurality of groups or disperses them into several blocks to perform the printing. However, a change in the density of the image data in a feed direction of the paper sheet is large, for example, such as a case where a color is rapidly changed from white to black, or black to white, repeatability of printed pixels and between the pixels decreases due to a delay of a thermal response of the thermal head, for example. As a result, the repeatability of one dot in a printed material decreases.

The present invention therefore has been made to solve the above problems, and it is an object of the present invention to provide a thermal printer achieving high repeatability of one dot even in an image having a large change in a density.

Means to Solve the Problem

A thermal printer according to the present invention includes: an image data extension processing unit generating extended image data having a plurality of extended pixels in which the number of pixels in a feed direction of a paper sheet is extended for image data of the image; a printing data correction processing unit correcting a density of at least one extended pixel of the plurality of extended pixels based on a change in a density of the plurality of extended pixels in the extended image data in the feed direction of the paper sheet or a change in a density of a plurality of pixels in the image data before being extended in the feed direction of the paper sheet; and a printing unit printing the image on the paper sheet by the thermal head based on the extended image data in which the density of the at least one extended pixel is corrected.

Effects of the Invention

According to the present invention, a thermal printer achieving high repeatability of one dot even in an image having a large change in a density can be provided.

These and other objects, features, aspects and advantages of the present invention will become more apparent from the following detailed description of the present invention when taken in conjunction with the accompanying drawings.

BRIEF DESCRIPTION OF DRAWINGS

[FIG. 1] A drawing illustrating a hardware configuration of a thermal printer in an embodiment 1.

DESCRIPTION OF EMBODIMENT(S)

Embodiment 1

(Configuration of Thermal Printer)

Figure 2:
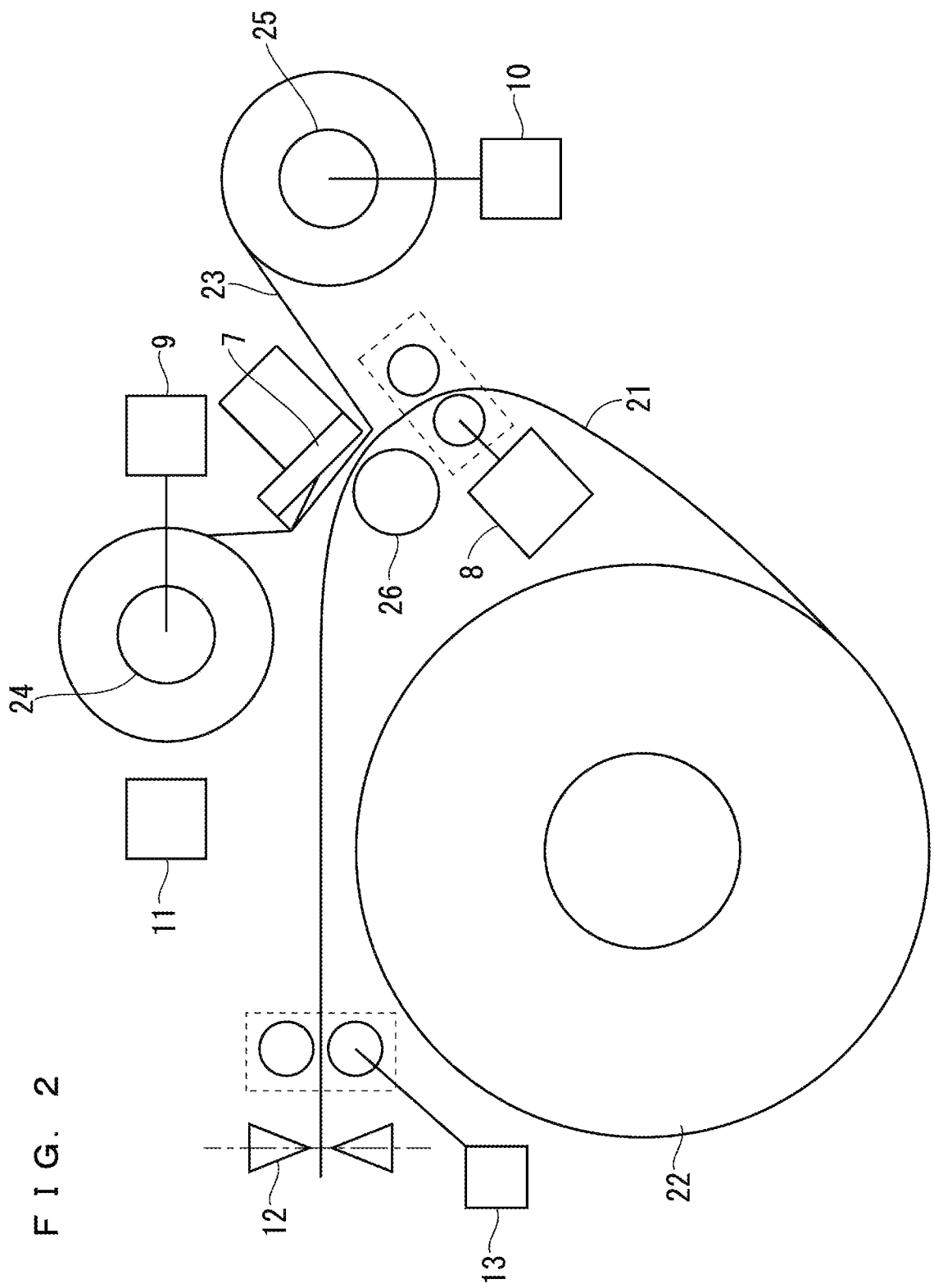
[FIG. 2] A schematic view illustrating a printing mechanism of the thermal printer in the embodiment 1.

FIG. 1 is a drawing illustrating a hardware configuration of a thermal printer 100 in an embodiment 1. FIG. 2 is a schematic view illustrating a printing mechanism of the thermal printer 100 in the embodiment 1. An illustration of the other configuration which does not directly relate to the description of the embodiment 1 is omitted in each drawing.

The thermal printer 100 includes a communication interface (I/F) 2, a memory 4, a processor 5, a paper sheet conveyance unit 8, a thermal head 7, a thermal head drive unit 6, a cutter 12, a paper ejection unit 13, a supply-side ink bobbin driver unit 9, a take-up ink bobbin drive unit 10, an ink sensor 11, and a data bus 14.

The communication I/F 2 receives whole image data of an image which is to be printed and information regarding a printing condition for printing the image from an information processing device 200 which is externally provided. The information processing device 200 is a personal computer, for example. The whole image data includes data of a density for each pixel. Information regarding the printing condition includes a printing size, for example.

The memory 4 has a temporary memory and a non-volatile memory. The temporary memory temporarily stores the whole image data and the data regarding the printing processing, for example, received in the communication I/F 2. The temporary memory is a random access memory (RAM) for example. The non-volatile memory stores a control program and an initial set value for controlling an operation of the thermal printer 100, for example. The non-volatile memory is a flash memory, for example.

The processor 5 converts the whole image data into printing data in accordance with the control program stored in the memory 4. The processor 5 generates energization pulse for controlling a heating amount for each heater element of the thermal head 7 in accordance with the density for each pixel included in the printing data. Furthermore, the processor 5 controls an operation of a printing mechanism in accordance with the control program. The processor 5 is a central processing unit (CPU), for example.

The paper sheet conveyance unit 8 takes out a paper sheet 21 from a roll of paper 22, and conveys the paper sheet 21 to the thermal head 7.

The thermal head 7 has a plurality of heater elements. The plurality of heater elements are linearly disposed in a direction intersecting a feed direction (conveyance direction) of the paper sheet 21. The thermal head 7 pressure-bonds an ink sheet 23 and the paper sheet 21 with a platen roller 26, and applies heat by the heater elements. At this time, the thermal head 7 heats the paper sheet 21 conveyed by the paper sheet conveyance unit 8 for each line based on the printing data. Ink applied on the ink sheet 23 is thermally transferred to the paper sheet 21 by the heating. Ink of yellow (Y), magenta (M), and cyan (C) and an overcoat (OP) surface made up of a material protecting light resistance and abrasion resistance of a printing surface are disposed on the ink sheet 23. The thermal printer 100 repeats the thermal transfer of each ink of Y/M/C/OP and conveyance for each printing screen.

The thermal head drive unit 6 drives the heater elements of the thermal head 7. Herein, the thermal head drive unit 6 applies current to the heater elements of the thermal head 7 based on the energization pulse.

The supply-side ink bobbin driver unit 9 rotates a supply-side ink bobbin 24 around which the ink sheet 23 is wound.

The take-up ink bobbin drive unit 10 rotates a take-up ink bobbin 25 for taking up the ink sheet 23 which is thermally transferred.

The ink sensor 11 detects a type and position of the ink sheet 23.

The cutter 12 cuts the paper sheet 21 which is printed by the thermal head 7 in a predetermined size. The predetermined size is, for example, an L size (127 mm in width and 89 mm in length).

The paper ejection unit 13 ejects the paper sheet 21 outside the thermal printer 100.

The data bus 14 has a mutual communication of transmitting a signal including data, for example, between the units.

Figure 3:
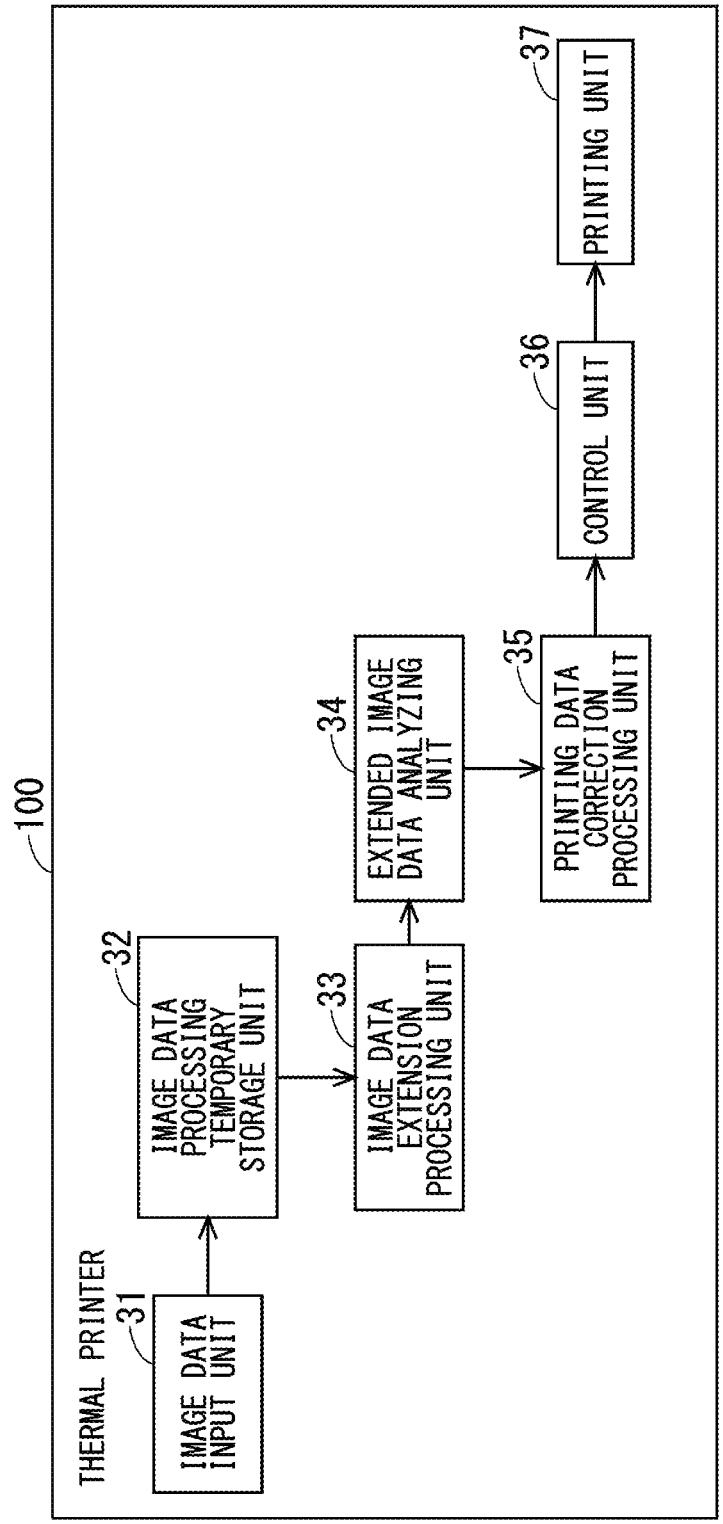
[FIG. 3] A functional block diagram illustrating a configuration of the thermal printer in the embodiment 1.

FIG. 3 is a functional block diagram illustrating a configuration of the thermal printer 100 in the embodiment 1. The functional block diagram in FIG. 3 illustrates each functional block relating to image processing for generating the printing data from the image data.

The thermal printer 100 has an image data input unit 31, an image data processing temporary storage unit 32, an image data extension processing unit 33, an extended image data analyzing unit 34, a printing data correction processing unit 35, a control unit 36, and a printing unit 37.

The image data input unit 31 takes in the image data necessary for the image processing from the whole image data stored in the memory 4. The image data includes data of a density for each pixel.

The image data processing temporary storage unit 32 is provided in the memory 4. The image data processing temporary storage unit 32 stores the image data obtained by the image data input unit 31.

The image data extension processing unit 33 generates the extended image data having a plurality of extended pixels in which the number of pixels in the feed direction of the paper sheet is extended for the image data. The extension of the number of pixels corresponds to an increase in the number of pixels of the image data in the feed direction of the paper sheet. Thus, the number of extended pixels included in the extended image data is larger than the number of pixels in the image data.

The extended image data analyzing unit 34 analyzes a change in a density of the plurality of extended pixels in the extended image data in the feed direction of the paper sheet, or analyzes a change in a density of the plurality of pixels in the image data before being extended in the feed direction of the paper sheet. When the extended image data analyzing unit 34 analyzes the change in a density of the plurality of extended pixels, the extended image data analyzing unit 34 compares, of the plurality of extended pixels, a density of one extended pixel and a density of an extended pixel located in front or back of the one extended pixel in the feed direction of the paper sheet. When the extended image data analyzing unit 34 analyzes the change in the density of the plurality of pixels in the image data before being extended, the extended image data analyzing unit 34 compares, of the plurality of pixels, a density of one pixel and a density of a pixel located in front or back of the one pixel in the feed direction of the paper sheet.

The printing data correction processing unit 35 corrects each density of at least one extended pixel of the plurality of extended pixels based on the change in the density of the plurality of extended pixels in the feed direction of the paper sheet of the extended image data or the change in the density of the plurality of pixels in the feed direction of the paper sheet of the image data before being extended, and generates the printing data.

The control unit 36 transmits the printing data generated in the printing data correction processing unit 35 to the printing unit 37.

The printing unit 37 includes the thermal head drive unit 6 controlling an amount of heat generation of the thermal head 7 and the thermal head 7 printing the image on the paper sheet 21. The printing unit 37 controls the amount of heat generation of the thermal head 7 based on the printing data in which the density is corrected for each extended pixel, and prints the image on the paper sheet 21. Specifically, the printing unit 37 generates the energization pulse based on the printing data, and the thermal head drive unit 6 controls the amount of heat generation of the thermal head 7 by the energization pulse.

Each function of the image data input unit 31, the image data processing temporary storage unit 32, the image data extension processing unit 33, the extended image data analyzing unit 34, the printing data correction processing unit 35, the control unit 36, and the printing unit 37 described above is achieved when the processor 5 illustrated in FIG. 1 executes a program stored in the memory 4. For example, when the processor 5 executes software or firmware described as the program, each function is achieved.

Described in the program is a function of the thermal printer 100 generating the extended image data having the plurality of extended pixels in which the number of pixels in the feed direction of the paper sheet is extended for the image data of the image, correcting the density of at least one extended pixel of the plurality of extended pixels based on the change in the density of the plurality of extended pixels in the extended image data in the feed direction of the paper sheet or the change in the density of the plurality of pixels in the image data before being extended in the feed direction of the paper sheet to generate the printing data, and printing the image on the paper sheet 21 by the thermal head 7 based on the printing data. The program makes the computer execute procedures or methods of the image data input unit 31, the image data processing temporary storage unit 32, the image data extension processing unit 33, the extended image data analyzing unit 34, the printing data correction processing unit 35, the control unit 36, and the printing unit 37.

The processor 5 is, for example, a central processing unit, a processing device, an arithmetic device, a microprocessor, a microcomputer, or a digital signal processor (DSP). The memory 4 is, for example, a non-volatile or volatile semiconductor memory such as a RAM (Random Access Memory), a ROM (Read Only Memory), a flash memory, an EPROM (Electrically Programmable Read Only Memory), or an EEPROM (Electrically Erasable Programmable Read Only Memory). The memory 4 may be a magnetic disc, a flexible disc, an optical disc, a compact disc, a mini disc, a DVD (Digital Versatile Disc), or any storage medium which is to be used in the future.

Functions of each unit may be achieved by a processing circuit including the processor 5 and the memory 4. When the processing circuit is a dedicated hardware, the processing circuit is a single circuit, a complex circuit, a programmed processor, a parallel-programmed processor, an application specific integrated circuit (ASIC), a field-programmable gate array (FPGA), or a combination of them, for example. Each function may be separately achieved by the plurality of processing circuits, or may also be collectively achieved by one processing circuit.

It is applicable that part of each function is achieved by dedicated hardware and the other part thereof is achieved by software or firmware. In this manner, the processing circuit achieves each function described above by the hardware, the software, the firmware, or the combination of them.

(Configuration of Image Data)

Figure 4:
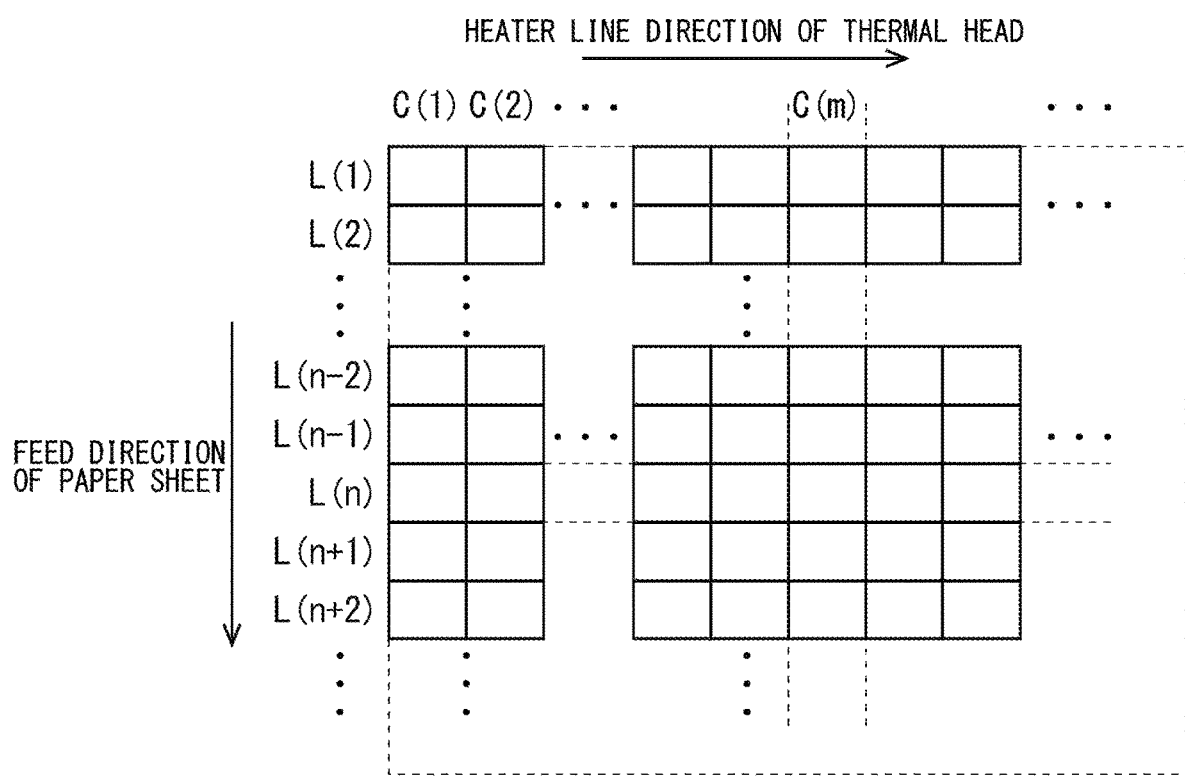
[FIG. 4] A drawing illustrating an example of a configuration of image data in the embodiment 1.

Described next is an example of a configuration of the image data in the embodiment 1. FIG. 4 is a drawing illustrating an example of a configuration of the image data. For example, when the thermal printer 100 performs borderless printing on the paper sheet 21 of L size (89 mm in length×127 mm in width) without a margin around the paper sheet 21 at a print resolution of 300 dpi, the image data has a plurality of pixels of 1076×1568 dots. The width direction of the paper sheet 21 corresponds to a direction in which the heater elements of the thermal head 7 are linearly disposed, that is to say, a heater line direction. The number of pixels in the heater line direction is 1568 pixels. The number of pixels in the longitudinal direction of the paper sheet 21, that is to say, the number of pixels in the feed direction of the paper sheet is 1076 pixels (1076 lines). In FIG. 4, a position of each pixel in a direction parallel to the heater line direction is expressed by C (m). A position of each pixel in a direction parallel to the feed direction of the paper sheet is expressed by L (n). A printing operation described hereinafter is an example of an operation for correcting a density of each pixel in which the position in the heater line direction is C (m) and the position in the feed direction of the paper sheet ranges from L (n−2) to L (n+2). The pixel in which the position in the feed direction of the paper sheet is L(n) is expressed as the pixel L(n) hereinafter.

(Printing Operation of Thermal Printer)

Figure 5:
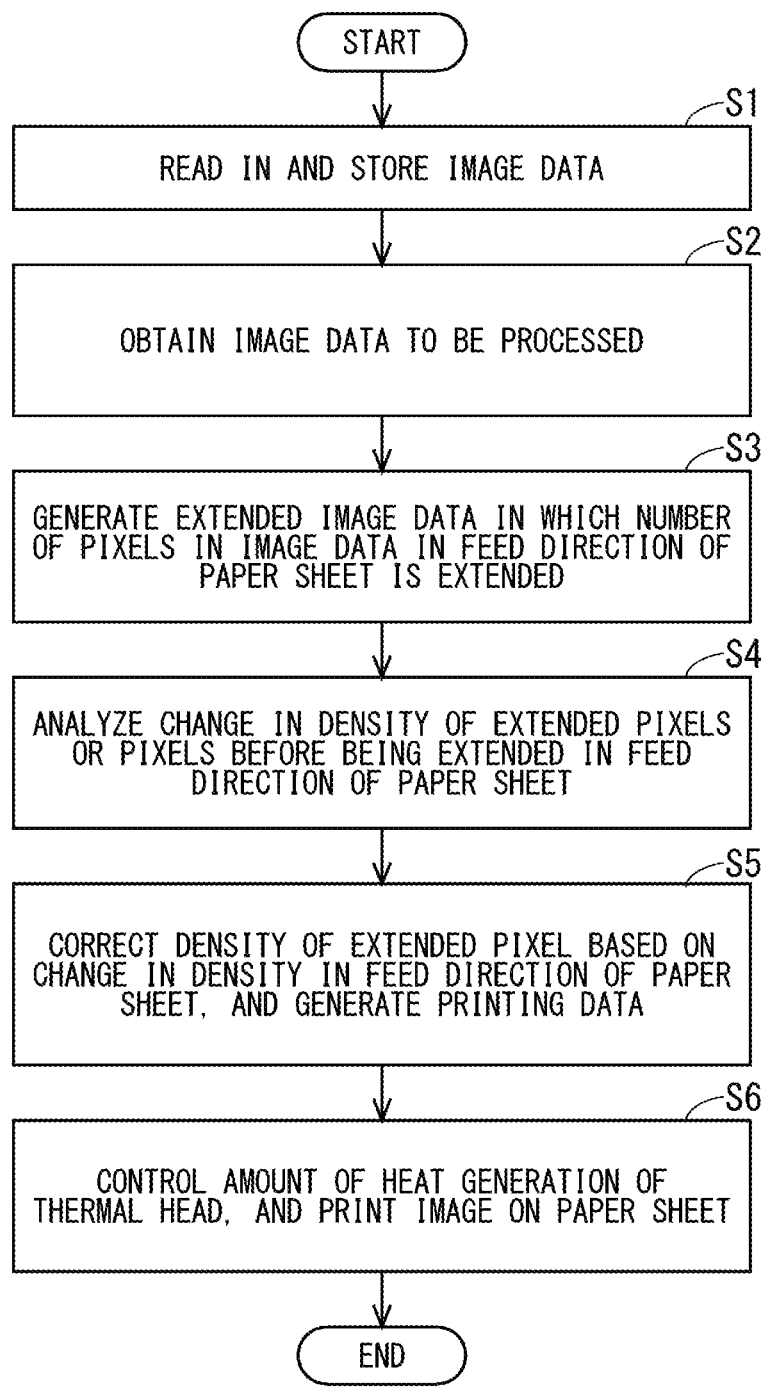
[FIG. 5] A flow chart illustrating a printing operation of the thermal printer in the embodiment 1.

FIG. 5 is a flow chart illustrating a printing operation of the thermal printer 100 in the embodiment 1.

In Step S1, the thermal printer 100 reads in the whole image data transmitted from the information processing device 200, and stores the whole image data in the memory 4. The thermal printer 100 also obtains the printing condition and stores it in the memory 4.

In Step S2, the image data input unit 31 obtains the image data to be processed from the whole image data stored in the memory 4. Herein, the image data input unit 31 obtains the image data of each pixel included in five lines of the pixels L(n−2) to L(n+2) with the pixel L(n) in a center as the image data to be processed. Then, the image data processing temporary storage unit 32 stores the image data of the five lines.

Figure 6:
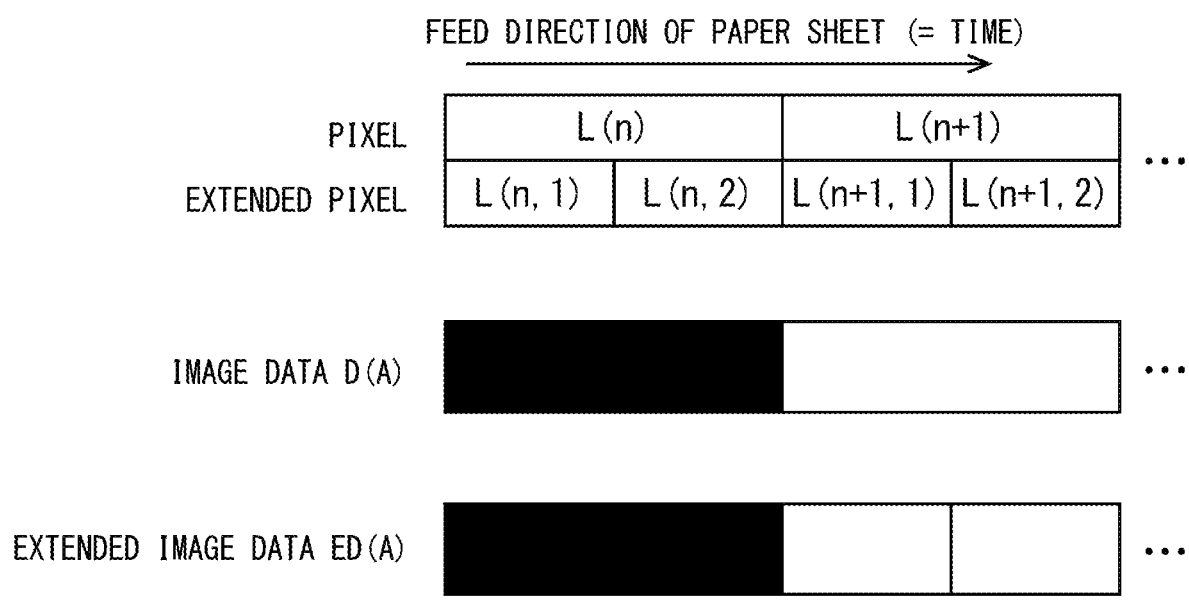
[FIG. 6] A drawing illustrating a relationship between the image data and extended image data in the embodiment 1.

In Step S3, the image data extension processing unit 33 generates the extended image data in which the number of pixels of the image data in the feed direction of the paper sheet is extended. Herein, the image data extension processing unit 33 generates the extended image data in which the number of pixels in the feed direction of the paper sheet is doubled. FIG. 6 is a drawing illustrating a relationship between image data D(A) and extended image data ED(A). The pixel L(n) has two extended pixels as a result of being extended to double. The extended pixel is indicated by two parameters of "a number n indicating a position of the original pixel" and "a position in the original pixel in the feed direction of the paper sheet" hereinafter. For example, the pixel L(n) has two extended pixels L(n, 1) and L(n, 2). In the similar manner, the pixel L(n+1) has two extended pixels L(n+1, 1) and L(n+1, 2) as a result of being extended to double. The other pixel also has a plurality of extended pixels in the similar manner. A magnification ratio of extension is not limited to the double. The magnification ratio of the extension is determined based on a printing speed of the thermal printer 100, a storage capacity of the memory 4, a data processing capacity of the processor 5, and a thermal responsiveness of the thermal head 7, for example. The magnification ratio or the number of lines may be increased. That is to say, the magnification ratio may be the double or more.

The image data extension processing unit 33 in the embodiment 1 sets each density of the extended pixels L(n, 1) and L(n, 2) based on the density of the pixel L(n) before being extended. In the embodiment 1, the density of the original pixel is copied to each density of the extended pixels L(n, 1) and L(n, 2) for simplifying the explanation. In the image data extension processing unit 33, the density of the extended pixels corresponding to the pixels L(n−2), L(n−1), L(n+1), and L(n+2) in the other lines, respectively, is also set in the similar manner.

In Step S4, the extended image data analyzing unit 34 analyzes the change in the density of the extended pixels in the feed direction of the paper sheet or the change in the density of the pixels before being extended. Herein, the extended image data analyzing unit 34 compares the changes in the density of the plurality of pixels before being extended. With the pixel L(n) in the center, the plurality of pixels are included in the five lines of the pixels L(n−2) to L(n+2) located in front and back of the pixel L(n) in the feed direction of the paper sheet. For example, the extended image data analyzing unit 34 compares, of the plurality of pixels L(n−2) to L(n+2), the density of the pixel L(n) and the density of the pixel L(n−1) located in front of the pixel L(n) or the pixel L(n+1) located in back of the pixel L(n) in the feed direction of the paper sheet. The extended image data analyzing unit 34 may analyze the change in the density of the extended pixels in the feed direction of the paper sheet.

In Step S5, the printing data correction processing unit 35 corrects each density of at least one extended pixel of the plurality of extended pixels based on the change in the density in the feed direction of the paper sheet, and generates the printing data. At this time, the printing data correction processing unit 35 performs the correction in consideration of a delay of the thermal response of the heater elements in relation to the change in the density. Specifically, the printing data correction processing unit 35 performs the correction on a part where the density changes and the lines located in front and back of the part so that repeatability of one dot in the image after being printed is increased. A specific example of the correction is described hereinafter.

In Step S6, the control unit 36 transmits the printing data to the printing unit 37. The printing unit 37 controls the amount of heat generation of the thermal head 7 based on the printing data. The thermal head 7 prints the image on the paper sheet 21 in accordance with the control of the amount of heat generation performed by the printing unit 37. Specifically, the energization pulse for controlling the heating amount of the heater elements is generated in accordance with the density of the printing data. The thermal head drive unit 6 applies current to the heater elements of the thermal head 7 based on the energization pulse. The paper sheet conveyance unit 8 takes out the paper sheet 21 from the roll of paper 22, and conveys the paper sheet 21 to the thermal head 7. The platen roller 26 and the thermal head 7 pressure-bond the paper sheet 21 and the ink sheet 23, and the paper sheet conveyance unit 8 conveys the paper sheet 21 while the heat is applied to each line. The thermal transfer is thereby performed. The thermal transfer and the conveyance are repeated for each printing screen for each ink of Y/M/C/OP. The thermal printer 100 performs the operation described above on all of the lines in the feed direction of the paper sheet, thereby printing one screen.

The paper sheet 21 in which the printing is finished is cut in a predetermined size by the cutter 12, and is ejected outside the thermal printer 100 by the paper ejection unit 13.

Figure 7:
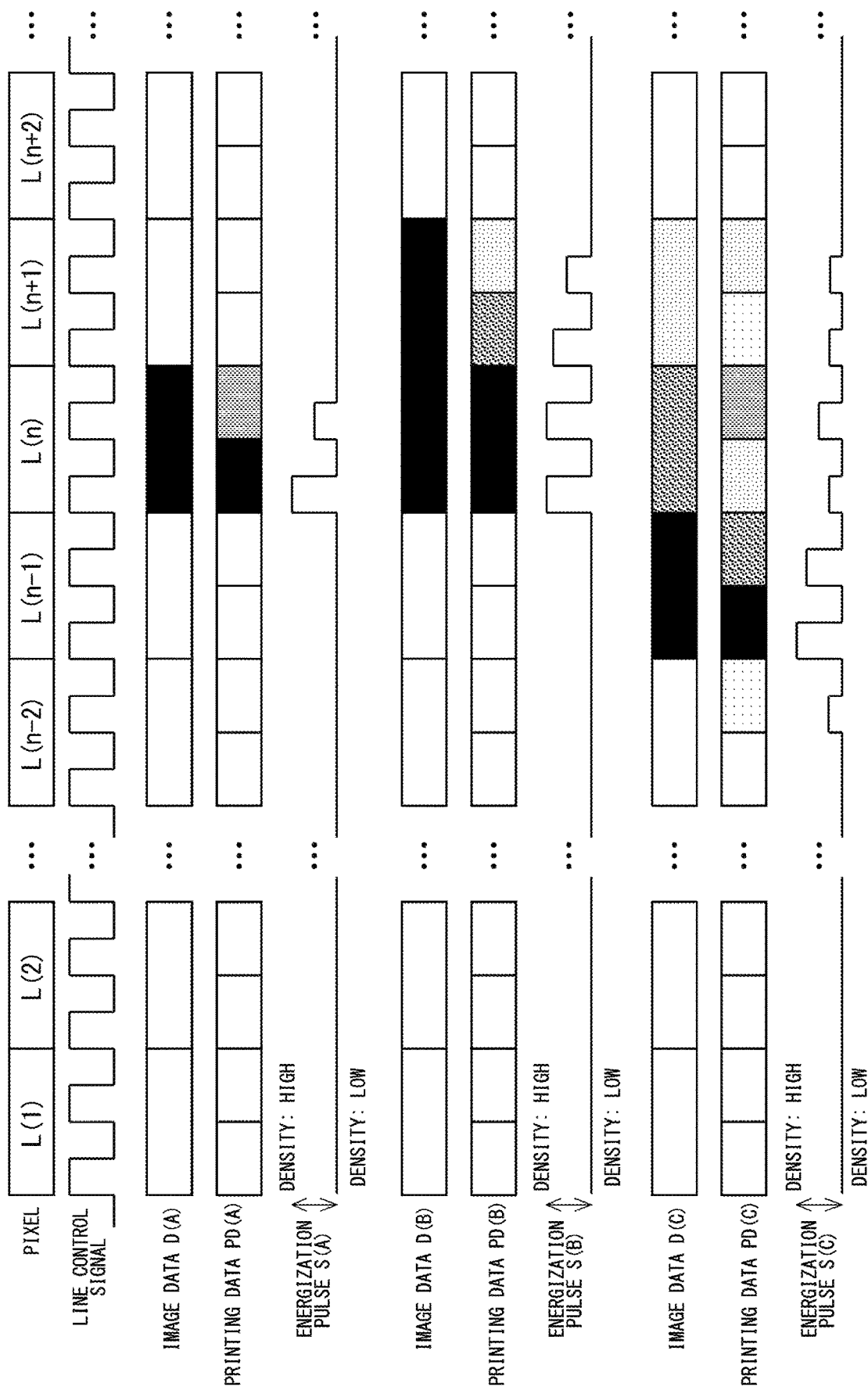
[FIG. 7] A drawing illustrating a specific printing operation of the thermal printer in the embodiment 1.

Next, a specific example of the correction of the density is described. FIG. 7 is a drawing illustrating a specific printing operation of the thermal printer 100 in the embodiment 1. In FIG. 7, a horizontal axis indicates the feed direction of the paper sheet, that is to say, a time axis, and three types of image data, the printing data in which the density is corrected for each extended pixel, and the energization pulse are illustrated side by side in a vertical direction. Although the illustration is omitted, the extended pixel is similar to that in FIG. 6.

In the image data D(A), a color of the pixels L(n−2), L(n−1), L(n+1), and L(n+2) is white (density: 0%). A color of the pixel L(n) is black (density: 100%). The image data extension processing unit 33 generates the extended image data in which the number of pixels in the image data in the feed direction of the paper sheet is extended to double. Furthermore, the extended image data analyzing unit 34 analyzes the change in the density in the image data in the feed direction of the paper sheet. Then, the printing data correction processing unit 35 corrects the density for each extended pixel based on the change in the density of the image data, and generates printing data PD(A).

In the printing data PD(A), the density of the extended pixel L(n, 1) is 100%, however, the density of the extended pixel L(n, 2) is corrected to 50%. An energization pulse S(A) is also corrected to correspond to the density of each extended pixel.

In image data D(B), a color of the pixels L(n−2), L(n−1), and L(n+2) is white. A color of the pixels L(n) and L(n+1) is black.

In printing data PD(B) in which the density is corrected for each extended pixel, the density of the extended pixels L(n, 1) and L(n, 2) is 100%. In the meanwhile, the density of the extended pixel L(n+1, 1) is corrected to 75%, and the density of the extended pixel L(n+1, 2) is corrected to 50%. An energization pulse S(B) is also corrected to correspond to the density of each extended pixel.

In image data D(C), a color of the pixels L(n−2) and L(n+2) is white. A color of the pixel L(n−1) is black. A color of the pixel L(n) is gray whose density is 50% of black. A color of the pixel L(n+1) is gray whose density is 15% of black.

In printing data PD(C) in which the density is corrected for each extended pixel, the density of the extended pixel L(n−2, 2) is corrected to 5%, the density of the extended pixel L(n−1, 1) is corrected to 100%, the density of the extended pixel L(n−1, 2) is corrected to 65%, the density of the extended pixel L(n, 1) is corrected to 35%, the density of the extended pixel L(n, 2) is corrected to 50%, the density of the extended pixel L(n+1, 1) is corrected to 5%, and the density of the extended pixel L(n+1, 2) is corrected to 15%. An energization pulse S(C) is also corrected to correspond to the density of each extended pixel.

(Effect)

The thermal printer 100 in the embodiment 1 extends the pixel of the image data in the feed direction of the paper sheet to an integral multiple. The thermal printer 100 compares the density in the feed direction of the paper sheet, thereby obtaining the change in the density. The thermal printer 100 sets a small correction amount in a region having a small change in the density, and sets a large correction amount in a region having a large change in the density. As described above, the thermal printer 100 performs the correction in consideration of the delay of the thermal response in relation to the change in the density. The thermal printer 100 provides the printing having high repeatability of one dot and high sharpness even in the image having the large change in the density in the feed direction of the paper sheet.

Figure 8:
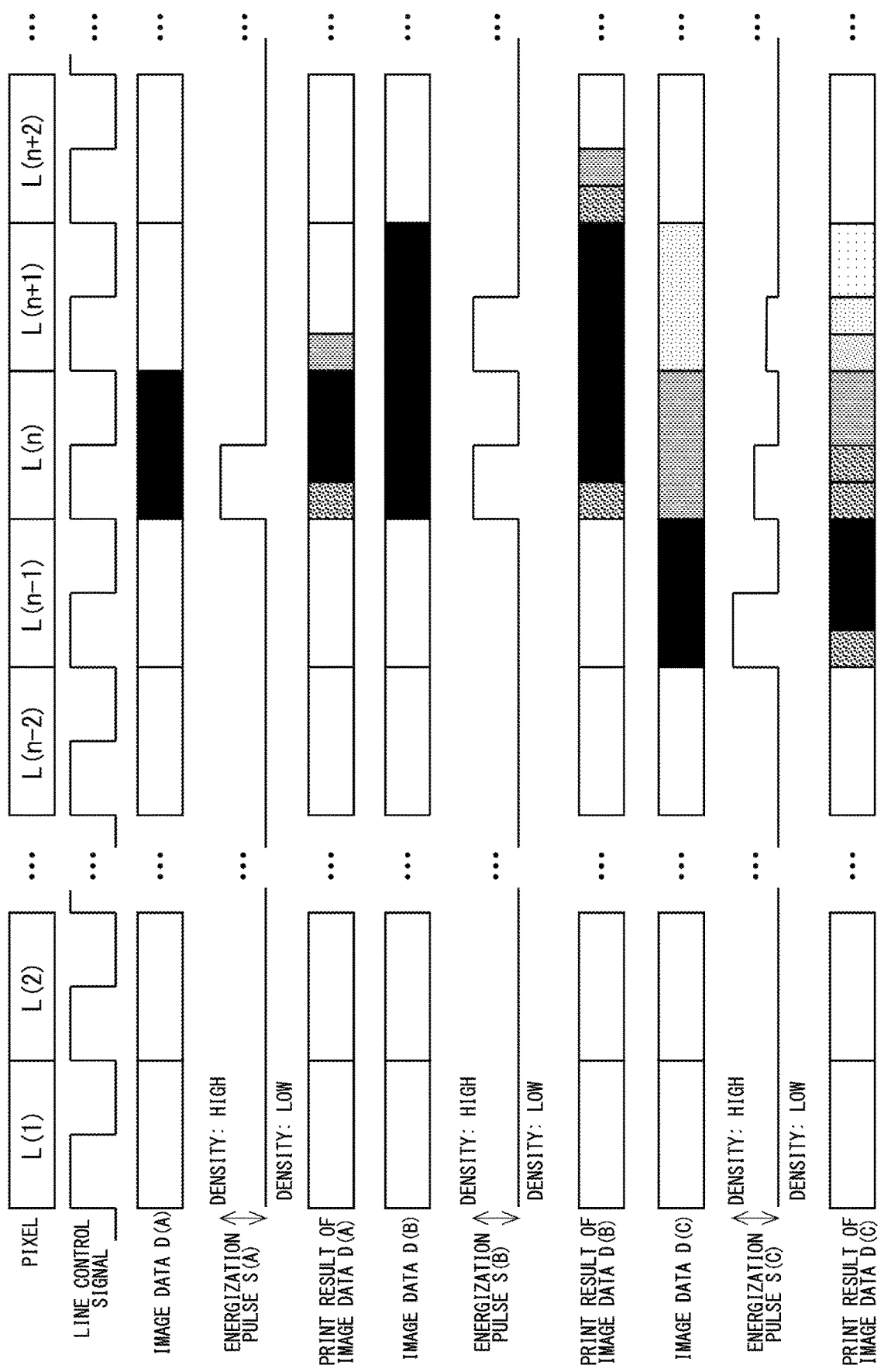
[FIG. 8] A drawing illustrating a specific printing operation of a thermal printer which does not perform printing based on the extended image data.

In the meanwhile, a thermal printer which does not generate the extended image data but prints the original image data as it is cannot sufficiently correct the delay of the thermal response in relation to the change in the density. Particularly, in a region having a large change in the density, the repeatability of one dot of the image after being printed is decreased, and the sharpness is lowered. FIG. 8 is a drawing illustrating a specific printing operation of the thermal printer which does not perform printing based on the extended image data. FIG. 8 illustrates an example of printing the same pieces of image data D(A), D(B), and D(C) as those in FIG. 7. As indicated by the printing result corresponding to each image data, the sharpness of the image is decreased due to the delay of the thermal response of the thermal head 7 in the region having the large change in the density.

The following is an outline of the above description. The thermal printer 100 in the embodiment 1 includes: the image data extension processing unit 33 generating the extended image data having the plurality of extended pixels in which the number of pixels in the feed direction of the paper sheet is extended for the image data of the image; the printing data correction processing unit 35 correcting the density of at least one extended pixel of the plurality of extended pixels based on the change in the density of the plurality of extended pixels in the extended image data in the feed direction of the paper sheet or the change in the density of the plurality of pixels in the image data before being extended in the feed direction of the paper sheet; and the printing unit 37 printing the image on the paper sheet 21 by the thermal head 7 based on the extended image data in which the density of the at least one extended pixel is corrected.

The thermal printer 100 having the above configuration can provide the printing having the high repeatability of one dot and the high sharpness even in the image having the large change in the density in the feed direction of the paper sheet.

The thermal printer 100 in the embodiment 1 further includes the extended image data analyzing unit 34 analyzing the change in the density of the plurality of extended pixels in the extended image data in the feed direction of the paper sheet, or analyzing the change in the density of the plurality of pixels in the image data before being extended in the feed direction of the paper sheet. In analyzing the change in the density of the plurality of extended pixels, the extended image data analyzing unit 34 compares, of the plurality of extended pixels, the density of one extended pixel and the density of the extended pixel located in front or back of the one extended pixel in the feed direction of the paper sheet. In analyzing the change in the density of the plurality of pixels, the extended image data analyzing unit 34 compares, of the plurality of pixels, the density of one pixel and the density of the pixel located in front or back of the one pixel in the feed direction of the paper sheet.

According to the above configuration, the thermal printer 100 can provide the printing having the high repeatability of one dot and the high sharpness even in the image having the rapid change in the density in the feed direction of the paper sheet for each pixel.

The printing method in the embodiment 1 includes the steps of: generating the extended image data having the plurality of extended pixels in which the number of pixels in the feed direction of the paper sheet is extended for the image data of the image; correcting the density of at least one extended pixel of the plurality of extended pixels based on the change in the density of the plurality of extended pixels in the extended image data in the feed direction of the paper sheet or the change in the density of the plurality of pixels in the image data before being extended in the feed direction of the paper sheet; and printing the image on the paper sheet 21 by the thermal head 7 based on the extended image data in which the density of the extended pixel is corrected.

The printing method having the above configuration can provide the printing having the high repeatability of one dot and the high sharpness even in the image having the large change in the density in the feed direction of the paper sheet.

Modification Example of Embodiment 1

In the embodiment 1, the density of the original pixel is copied to the density of the extended pixel generated by the image data extension processing unit 33. In the meanwhile, the image data extension processing unit according to a modification example of the embodiment 1 sets the density of each extended pixel so that the density of the plurality of extended pixels changes in stages based on the density of the original pixel or the pixel located in front or back of the original pixel. For example, when there is a large change in the density between one pixel to be extended and the other pixel located in front or back of the one pixel, the image data extension processing unit sets the density of each extended pixel to be changed in stages. Alternatively, the image data extension processing unit may copy the density of the original pixel, which corresponds to at least one extended pixel, to the at least one extended pixel of the plurality of extended pixels, and set the density of the other extended pixel to be intermediate between the adjacent pixels. The image data extension processing unit sets the density of the plurality of extended pixels in stages as described above, thus the correction of the density subsequently performed by the printing data correction processing unit 35 becomes more effective.

Embodiment 2

A thermal printer and a printing method in an embodiment 2 are described. A description of a configuration and operation similar to those in the embodiment 1 is omitted.

The thermal printer 100 in the embodiment 1 extends the pixel of the image data in the feed direction of the paper sheet to double. However, there is also a case where the correction of increasing the repeatability of one dot described above is not necessary depending on the change in the density of the image data. The thermal printer in the embodiment 2 analyzes whether or not the pixel (line) in the image data in the feed direction of the paper sheet needs to be extended and corrected. For example, when an image having a large change in the density is printed, that is to say, when an image having a large amount of high-frequency component regarding the change in the density is printed, the thermal printer in the embodiment 2 extends the number of pixels and performs the correction. In the meanwhile, when an image having a small change in the density is printed, that is to say, when an image having a small amount of high-frequency component regarding the change in the density is printed, the thermal printer does not extend the number of pixels but prints the original image as it is.

Figure 9:
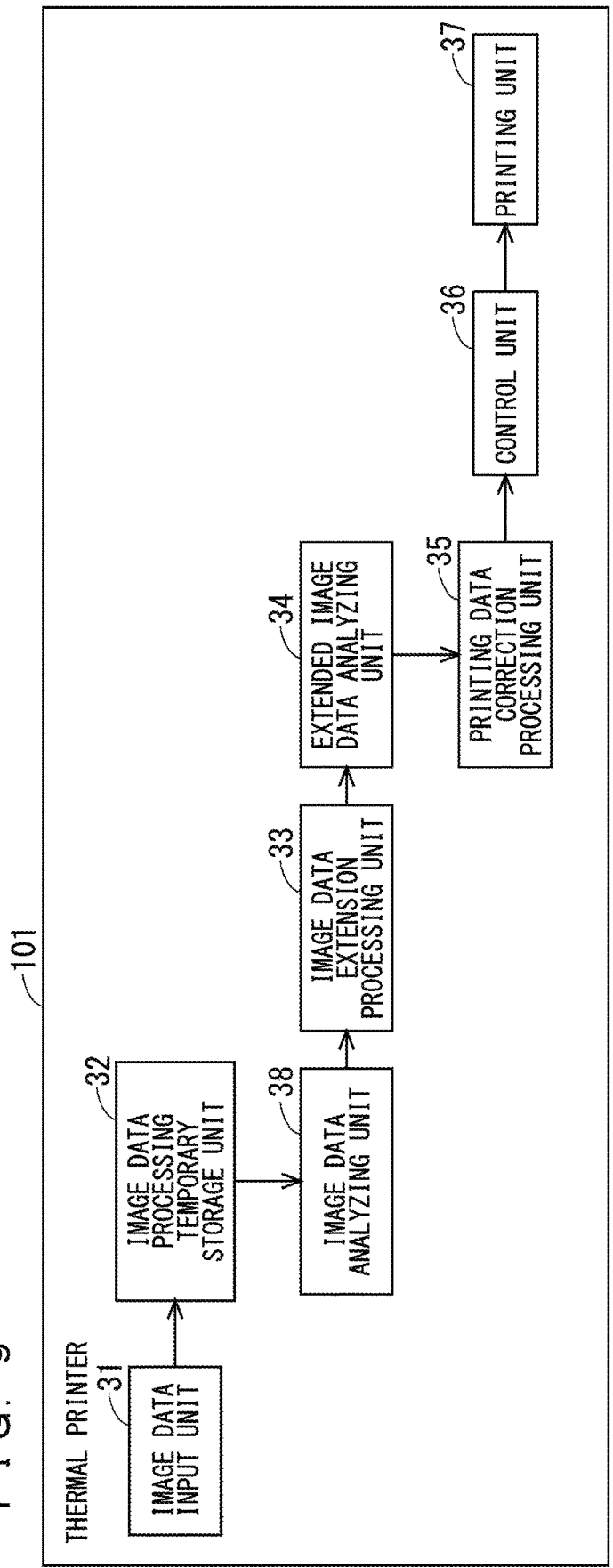
[FIG. 9] A functional block diagram illustrating a configuration of a thermal printer in an embodiment 2.

FIG. 9 is a functional block diagram illustrating a configuration of a thermal printer 101 in the embodiment 2. The thermal printer 101 includes an image data analyzing unit 38 in addition to the configuration in the embodiment 1.

The image data analyzing unit 38 analyzes the change in the density of the plurality of pixels in the image data in the feed direction of the paper sheet before the image data extension processing unit 33 generates the extended image data.

The image data extension processing unit 33 extends the number of pixels in the image data in the feed direction of the paper sheet to the number of extended pixels determined based on the analysis result of the image data analyzing unit 38. The extended image data is thereby generated.

Each function of the image data analyzing unit 38 and the image data extension processing unit 33 is described in a program and achieved when the processor 5 and the memory 4 illustrated in FIG. 1 execute the program.

Figure 10:
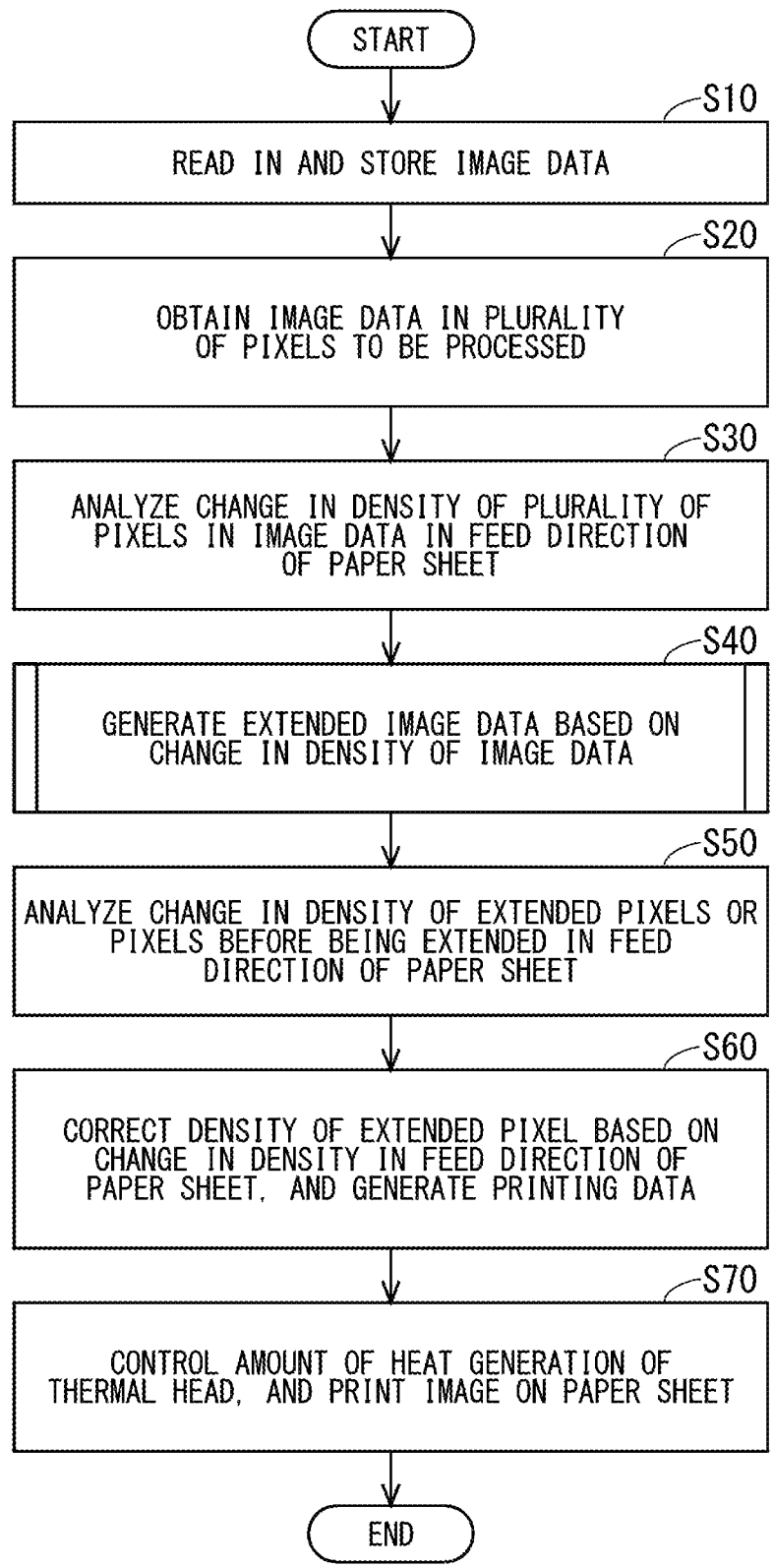
[FIG. 10] A flow chart illustrating a printing operation of the thermal printer in the embodiment 2.

FIG. 10 is a flow chart illustrating a printing operation of the thermal printer 101 in the embodiment 2.

In Step S10, the thermal printer 101 reads in the whole image data transmitted from the information processing device 200, and stores the whole image data in the memory 4. The thermal printer 101 also obtains the printing condition and stores it in the memory 4.

In Step S20, the image data input unit 31 obtains the image data to be processed from the whole image data stored in the memory 4. Herein, the image data input unit 31 obtains the image data of each pixel included in five lines of the pixels L(n−2) to L(n+2) with the pixel L(n) in a center as the image data to be processed. Then, the image data processing temporary storage unit 32 stores the image data of the five lines.

In Step S30, the image data analyzing unit 38 analyzes the change in the density of the plurality of pixels in the image data in the feed direction of the paper sheet. Herein, the image data analyzing unit 38 analyzes the changes in the density of the pixels in the five lines of the pixels L(n−2) to L(n+2) located in front and back of the pixel L(n) in the feed direction of the paper sheet with the pixel L(n) in the center.

Figure 11:
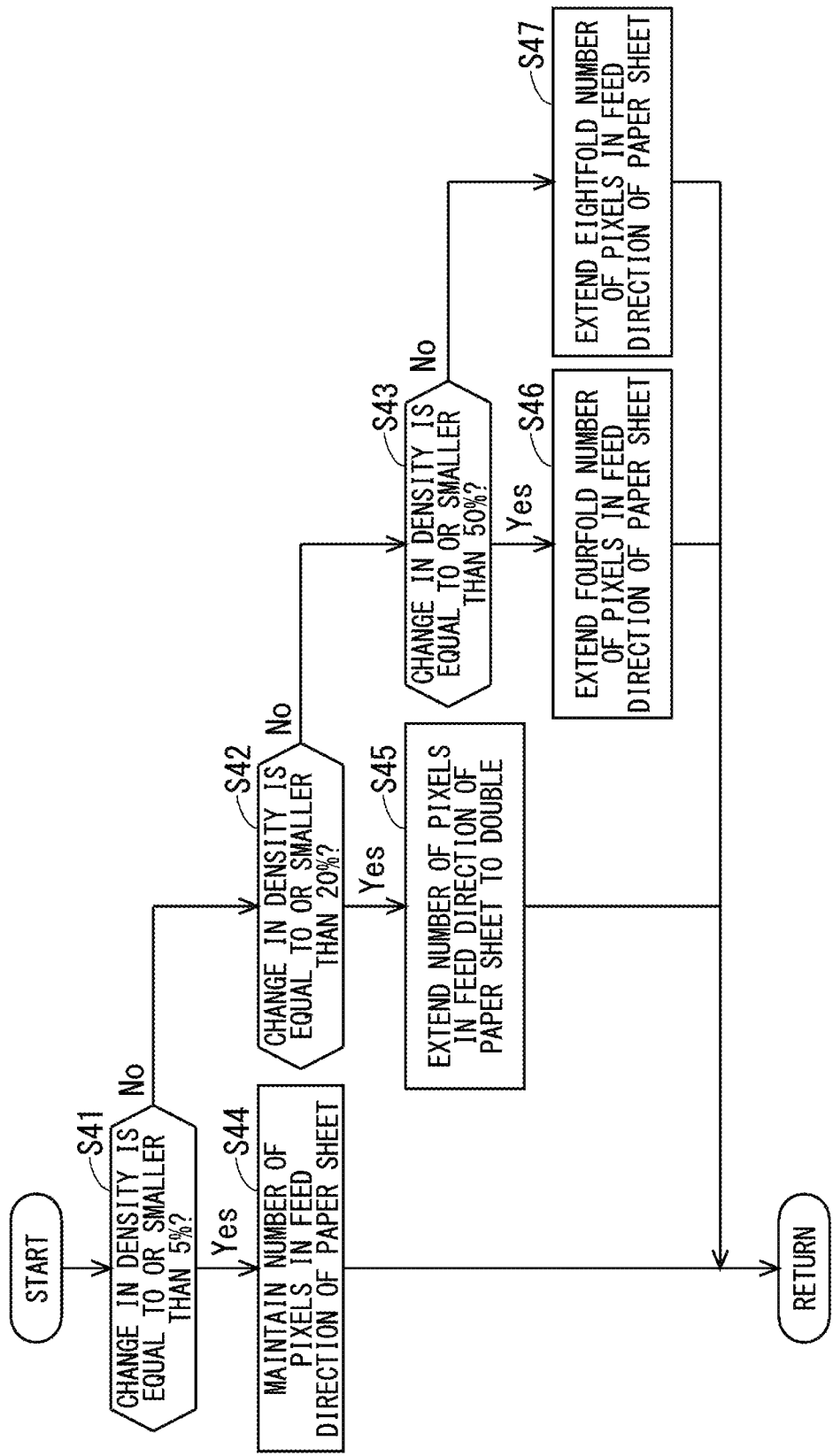
[FIG. 11] A flow chart illustrating details of a method of generating extended image data in the embodiment 2.

In Step S40, the image data extension processing unit 33 generates the extended image data based on the change in the density of the image data analyzed in the image data analyzing unit 38. FIG. 11 is a flow chart illustrating details of a method of generating the extended image data in Step S40.

In Step S41, the image data extension processing unit 33 determines whether or not the change in the density is equal to or smaller than 5%. When the change in the density is equal to or smaller than 5%, Step S44 is executed. When the change in the density is larger than 5%, Step S42 is executed.

In Step S42, the image data extension processing unit 33 determines whether or not the change in the density is equal to or smaller than 20%. When the change in the density is equal to or smaller than 20%, Step S45 is executed. When the change in the density is larger than 20%, Step S43 is executed.

In Step S43, the image data extension processing unit 33 determines whether or not the change in the density is equal to or smaller than 50%. When the change in the density is equal to or smaller than 50%, Step S46 is executed. When the change in the density is larger than 50%, Step S47 is executed.

In Step S44, the image data extension processing unit 33 does not extend the number of pixels in the image data in the feed direction of the paper sheet but keeps the number of pixels to single.

In Step S45, the image data extension processing unit 33 generates the extended image data in which the number of pixels in the image data in the feed direction of the paper sheet is extended to double.

In Step S46, the image data extension processing unit 33 generates the extended image data in which the number of pixels in the image data in the feed direction of the paper sheet is extended fourfold.

In Step S47, the image data extension processing unit 33 generates the extended image data in which the number of pixels in the image data in the feed direction of the paper sheet is extended eightfold.

In accordance with detailed steps illustrated in FIG. 11, the image data extension processing unit 33 generates the extended image data corresponding to the change in the density in the image data. Each threshold value (5%, 20%, and 50%) used for determining the change in the density is an example, thus is not limited thereto. Subsequently, Step S50 in FIG. 10 is executed.

In Step S50, the extended image data analyzing unit 34 analyzes the change in the density of the extended pixels in the feed direction of the paper sheet or the change in the density of the pixels before being extended. Herein, the extended image data analyzing unit 34 compares the changes in the density of the plurality of extended pixels or the changes in the density of the plurality of pixels which are not extended. The plurality of extended pixels and the plurality of pixels are included in the five lines of the pixels L(n−2) to L(n+2) located in front and back of the pixel L(n) in the feed direction of the paper sheet with the pixel L(n) in the center.

In Step S60, the printing data correction processing unit 35 corrects each density of at least one extended pixel of the plurality of extended pixels based on the change in the density in the feed direction of the paper sheet, and generates the printing data. At this time, the printing data correction processing unit 35 performs the correction in consideration of a delay of the thermal response of the heater elements in relation to the change in the density. Specifically, the printing data correction processing unit 35 performs the correction on a part where the density changes and the lines located in front and back of the part so that the repeatability of one dot in the image after being printed is increased. A specific example of the correction is described hereinafter.

In Step S70, the control unit 36 transmits the printing data to the printing unit 37. The printing unit 37 controls the amount of heat generation of the thermal head 7 based on the printing data. The thermal head 7 prints the image on the paper sheet 21 in accordance with the control of the amount of heat generation performed by the printing unit 37.

The thermal printer 101 performs the operation described above on all of the lines in the feed direction of the paper sheet, thereby printing one screen.

Figure 12:
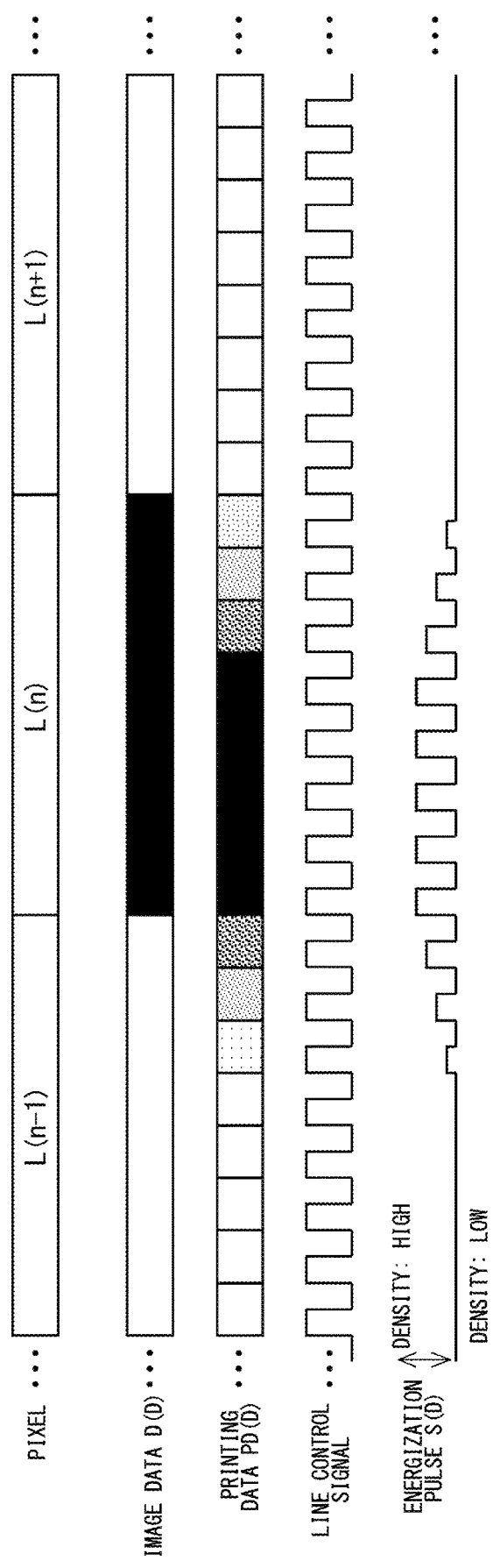
[FIG. 12] A drawing illustrating a specific printing operation of the thermal printer in the embodiment 2.
Figure 13:
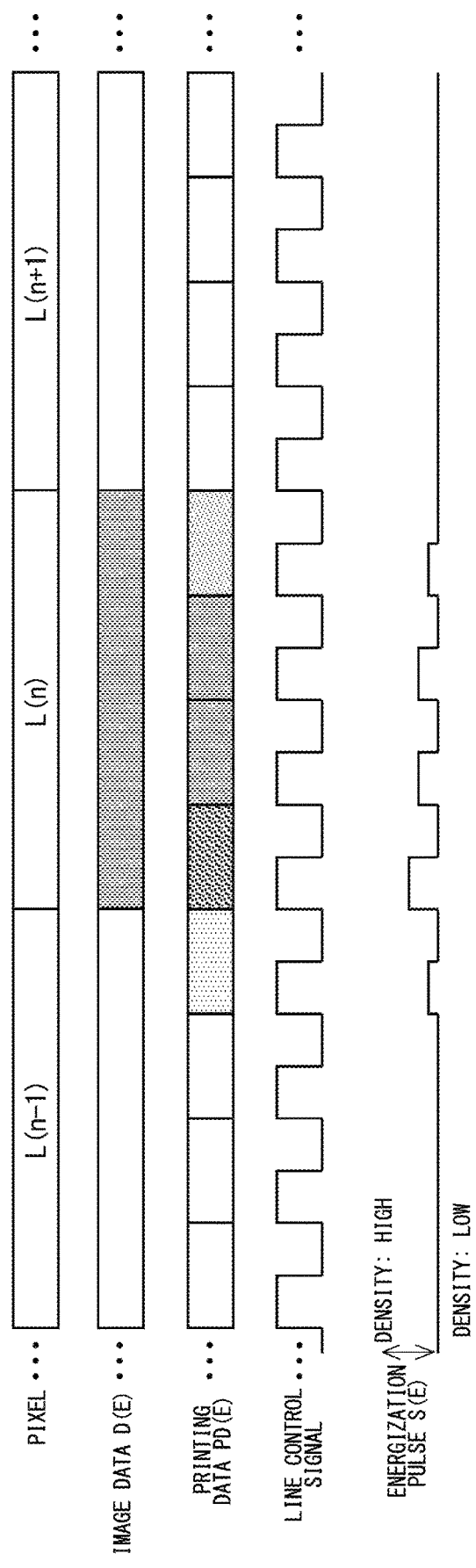
[FIG. 13] A drawing illustrating a specific printing operation of the thermal printer in the embodiment 2.
Figure 14:
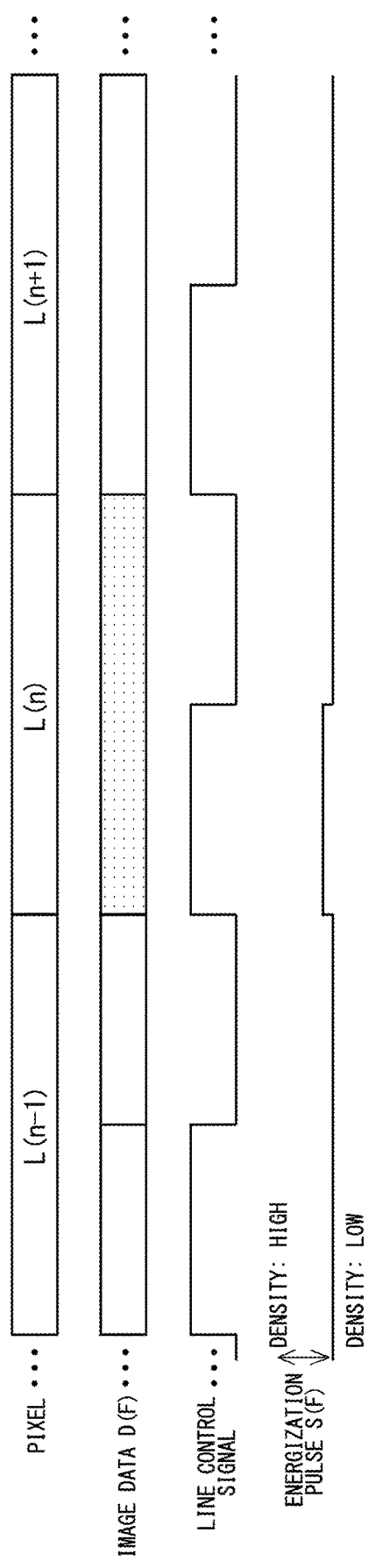
[FIG. 14] A drawing illustrating a specific printing operation of the thermal printer in the embodiment 2.
Figure 15:
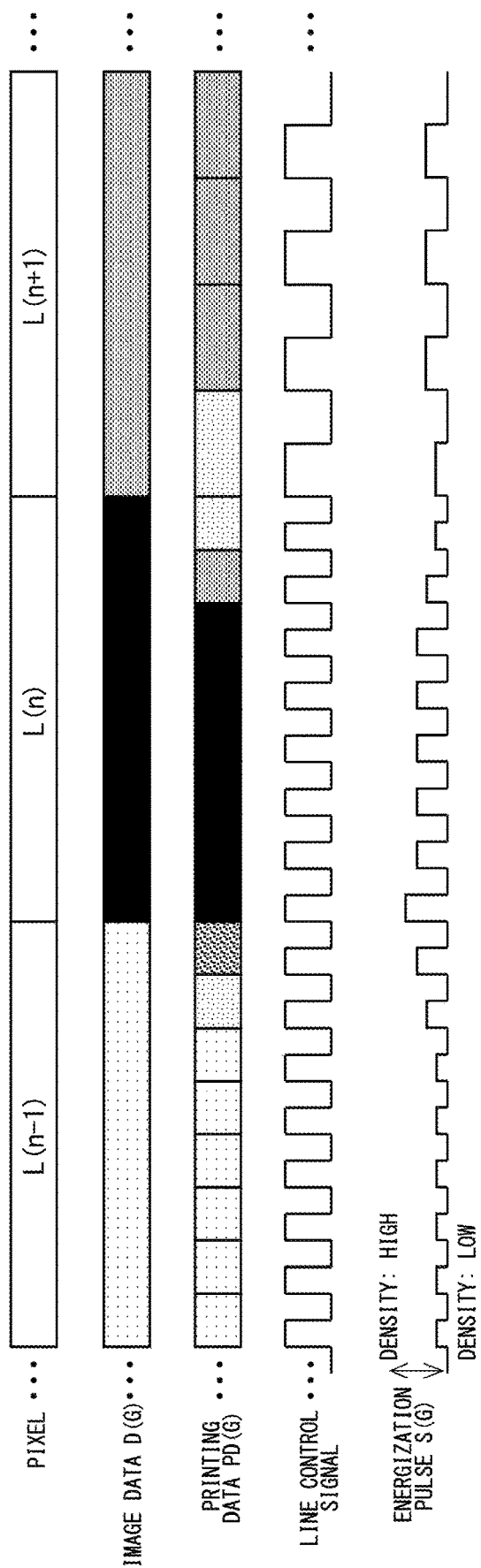
[FIG. 15] A drawing illustrating a specific printing operation of the thermal printer in the embodiment 2.

Next, a specific example of the correction of the density is described. FIGS. 12 to 15 are drawings each illustrating a specific printing operation of the thermal printer 101 in the embodiment 2. FIG. 12 illustrates an operation of printing image data D(D), FIG. 13 illustrates an operation of printing image data D(E), FIG. 14 illustrates an operation of printing image data D(F), and FIG. 15 illustrates an operation of printing image data D(G). In each drawing, a horizontal axis indicates the feed direction of the paper sheet, that is to say, a time axis, and each image data, the printing data in which the density is corrected for each extended pixel, and the energization pulse are illustrated side by side in a vertical direction. Each drawing illustrates only the three lines (of pixels L(n−1), L(n), and L(n+1)) in the pixels in the five lines obtained by the image data input unit 31 for simplifying the explanation, however, the correction processing of the density is performed in five lines in accordance with the example in the flow charts in FIGS. 10 and 11.

In the image data D(D) illustrated in FIG. 12, a color of the pixels L(n−1) and L(n+1) is white. A color of the pixel L(n) is black. Although the illustration is omitted, a color of the pixels L(n−2) and L(n+2) is also white.

The change in the density between the pixel L(n) and the pixels L(n−1) and L(n+1) located in front and back of the pixel L(n) exceeds 50%. The image data extension processing unit 33 generates the extended image data in which the number of pixels in the image data in the feed direction of the paper sheet is extended eightfold. Furthermore, the extended image data analyzing unit 34 analyzes the change in the density in the extended image data or the image data which is not extended in the feed direction of the paper sheet. Then, the printing data correction processing unit 35 corrects the density for each extended pixel based on the change in the density in the feed direction of the paper sheet, and generates printing data PD(D).

In printing data PD(D), the density of the extended pixel L(n−1, 6) is corrected to 5%, the density of the extended pixel L(n−1, 7) is corrected to 50%, and the density of the extended pixel L(n−1, 8) is corrected to 65%. The density of extended pixels L(n, 1) to L(n, 5) is 100% which is the same as that of the original pixel (n), however, the density of the extended pixel L(n, 6) is corrected to 75%, the density of the extended pixel L(n, 7) is corrected to 50%, and the density of the extended pixel L(n, 8) is corrected to 15%. An energization pulse S(D) is also corrected to correspond to the density of each extended pixel.

In the image data D(E) illustrated in FIG. 13, a color of the pixels L(n−1) and L(n+1) is white. A color of the pixel L(n) is gray whose density is 50% of black. Although the illustration is omitted, a color of the pixels L(n−2) and L(n+2) is also white.

The change in the density between the pixel L(n) and the pixels L(n−1) and L(n+1) located in front and back of the pixel L(n) exceeds 20%, but does not exceed 50%. The image data extension processing unit 33 generates the extended image data in which the number of pixels in the image data in the feed direction of the paper sheet is extended fourfold. Furthermore, the extended image data analyzing unit 34 analyzes the change in the density in the extended image data or the image data which is not extended in the feed direction of the paper sheet. Then, the printing data correction processing unit 35 corrects the density for each extended pixel based on the change in the density in the feed direction of the paper sheet, and generates printing data PD(E).

In printing data PD(E), the density of the extended pixel L(n−1, 4) is corrected to 15%, and the density of the extended pixel L(n, 1) is corrected to 65%. The density of the extended pixels L(n, 2) to L(n, 3) is 50% which is the same as that of the original pixel L(n), however, the density of the extended pixel L(n, 4) is corrected to 25%. An energization pulse S(E) is also corrected to correspond to the density of each extended pixel.

In the image data D(F) illustrated in FIG. 14, a color of the pixels L(n−1) and L(n+1) is white. A color of the pixel L(n) is gray whose density is 5% of black. Although the illustration is omitted, a color of the pixels L(n−2) and L(n+2) is also white.

The change in the density between the pixel L(n) and the pixels L(n−1) and L(n+1) located in front and back of the pixel L(n) does not exceed 5%. The image data extension processing unit 33 does not extend the number of pixels in the image data in the feed direction of the paper sheet, that is to say, it keeps the number of pixels to single. In this case, the density of the pixels L(n−1), L(n), and L(n+1) is not corrected. An energization pulse S(F) is not also corrected.

In the image data D(G) illustrated in FIG. 15, a color of the pixel L(n−1) is gray whose density is 5% of black. A color of the pixel L(n) is black. A color of the pixel L(n+1) is gray whose density is 50% of black. Although the illustration is omitted, a color of the pixels L(n−2) and L(n+2) is white.

The change in the density between the pixel L(n) and the pixel L(n−1) adjacent to the pixel L(n) exceeds 50%. The image data extension processing unit 33 generates the extended image data in which the number of pixels of the pixels L(n−1) and L(n) in the feed direction of the paper sheet is extended eightfold. In the meanwhile, the change in the density between the pixel L(n) and the pixel L(n+1) adjacent to the pixel L(n) exceeds 20%, but does not exceed 50%. The image data extension processing unit 33 generates the extended image data in which the number of pixels of the pixel L(n+1) in the feed direction of the paper sheet is extended fourfold. Furthermore, the extended image data analyzing unit 34 analyzes the change in the density in the extended image data or the image data which is not extended in the feed direction of the paper sheet. Then, the printing data correction processing unit 35 corrects the density for each extended pixel based on the change in the density in the feed direction of the paper sheet, and generates printing data PD(G).

In printing data PD(G), the density of the extended pixel L(n−1, 7) is corrected to 15%, and the density of the extended pixel L(n−1, 8) is corrected to 65%. The density of extended pixel L(n, 1) is 100% which is the same as that of the original pixel (n), however, the density of the extended pixels L(n, 2) to L(n, 6) is corrected to 85%, the density of the extended pixel L(n, 7) is corrected to 50%, the density of the extended pixel L(n, 8) is corrected to 35%, and the density of the extended pixel L(n+1, 1) is corrected to 35%. An energization pulse S(G) is also corrected to correspond to the density of each extended pixel.

In this manner, the thermal printer 101 in the embodiment 2 analyzes whether or not the pixel in the image data in the feed direction of the paper sheet needs to be extended and corrected. For example, when an image having a large change in the density in the image data is printed, that is to say, when an image having a large amount of high-frequency component regarding the change in the density is printed, the thermal printer 101 extends the number of pixels based on the degree of the change in the density and performs the correction. In the meanwhile, when an image having a small change in the density in the image data is printed, that is to say, when an image having a small amount of high-frequency component regarding the change in the density is printed, the thermal printer 101 does not extend the number of pixels but prints the original image as it is. Thus, the thermal printer 101 can effectively correct the delay of the thermal response in relation to the change in the density. The thermal printer 100 in the embodiment 2 provides the printing having high repeatability of one dot and high sharpness even in the image having the large change in the density. The high-frequency component regarding the change in the density indicates a high-frequency component in a frequency response obtained by Fourier-transforming a density distribution in the feed direction of the paper sheet, for example. That is to say, when the change in the density is rapid, a large amount of high-frequency component is included, and when the change in the density is gentle, a large amount of low-frequency component is included.

When the image having a small amount of high-frequency component regarding the change in the density of the image data is printed, the thermal printer 101 in the embodiment 2 prints the original image with a small number of pixels to be extended or without increasing the number of pixels to be extended. Thus, the thermal printer 101 enables the reduction in the time taken for the image processing, and as a result, the reduction in the print time is achieved.

The following is an outline of the above description. The thermal printer 101 in the embodiment 2 further includes the image data analyzing unit 38 analyzing the change in the density of the plurality of pixels in the image data before being extended in the feed direction of the paper sheet. The image data extension processing unit 33 extends the number of pixels in the image data in the feed direction of the paper sheet to the number of extended pixels determined based on the analysis result of the image data analyzing unit 38, thereby generating the extended image data.

The thermal printer 101 having the configuration described above provides the printing having the high repeatability of one dot and the high sharpness even in the image having the large change in the density. When the image having a small amount of high-frequency component regarding the change in the density of the image data is printed, the thermal printer 101 prints the original image with a small number of pixels to be extended or without increasing the number of pixels to be extended. Thus, the thermal printer 101 enables the reduction in the time taken for the image processing, and as a result, the reduction in the print time is achieved.

Embodiment 3

A thermal printer and a printing method in an embodiment 3 are described. A description of a configuration and operation similar to those in the embodiment 1 or 2 is omitted.

The thermal printer 100 in the embodiment 1 and the thermal printer 101 in the embodiment 2 include an extension means (the image data extension processing unit 33) of extending the pixel in the image data in the feed direction of the paper sheet, a correction means (the printing data correction processing unit 35) of correcting the image data based on the change in the density of the extended image data in the feed direction of the paper sheet, and an analyzing means (the image data analyzing unit 38) analyzing the density of the pixels in the image data in the feed direction of the paper sheet. Those thermal printers include a comparison means (the extended image data analyzing unit 34) of comparing the change in the density of the extended image data in the feed direction of the paper sheet. However, it is also applicable that an external information processing device other than the thermal printer previously performs the processing of each function unit and transmits the printing data on which the correction of the density is performed to the thermal printer.

Figure 16:
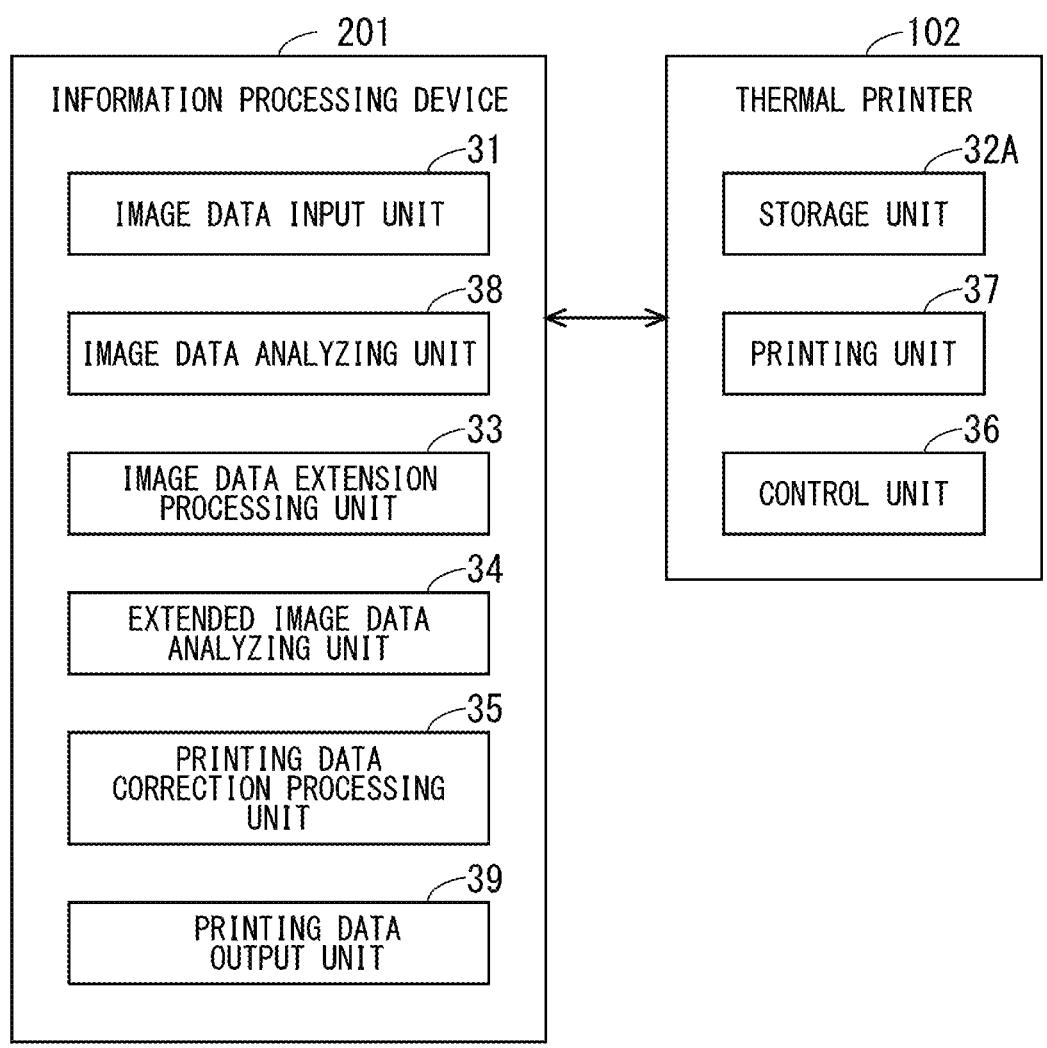
[FIG. 16] A functional block diagram illustrating a configuration of a printing system in an embodiment 3.

FIG. 16 is a functional block diagram illustrating a configuration of a printing system in an embodiment 3. The printing system includes an information processing device 201 and a thermal printer 102.

The information processing device 201 includes the image data input unit 31, the image data analyzing unit 38, the image data extension processing unit 33, the extended image data analyzing unit 34, the printing data correction processing unit 35, and a printing data output unit 39. The configurations and functions of the image data input unit 31, the image data analyzing unit 38, the image data extension processing unit 33, the extended image data analyzing unit 34, and the printing data correction processing unit 35 are similar to those of the embodiment 1 or 2.

The printing data output unit 39 outputs the printing data generated by the printing data correction processing unit 35 to the thermal printer 102. The printing data output unit 39 includes a communication unit communicating with the thermal printer 102, for example.

That is to say, the information processing device 201 outputs the printing data having the corrected density to the thermal printer 102. Each function in the information processing device 201 is achieved by a processor and a memory included in the information processing device 201.

The thermal printer 102 includes a storage unit 32A, the printing unit 37, and the control unit 36. The configuration and function of the printing unit 37 are similar to those of the embodiment 1 or 2.

The control unit 36 receives the printing data being output from the printing data output unit 39 in the information processing device 201. The control unit 36 transmits the printing data to the printing unit 37.

The printing unit 37 controls the amount of heat generation of the thermal head 7 based on the printing data, and prints the image on the paper sheet 21.

Such a printing system can previously perform the processing of the image data in the information processing device 201 including a high-capacity storage device and a CPU having a high processing speed. The printing system enables the processing of the large image data and the increase in the number of extended pixels in the image data in the feed direction of the paper sheet. The printing system reduces the print time of the thermal printer 102, and provides the printing having the high repeatability of one dot and the high sharpness.

According to the present invention, each embodiment can be arbitrarily combined, or each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 33 image data extension processing unit, 34 extended image data analyzing unit, 35 printing data correction processing unit, 37 printing unit, 38 image data analyzing unit, 39 printing data output unit, 100 thermal printer, 201 information processing device

The invention claimed is:
1. A thermal printer printing an image on a paper sheet by a thermal head, comprising:
    a processor to execute a program; and
    a memory to store the program which, when executed by the processor, causes the processor to perform processes of, generating extended image data having a plurality of extended pixels in which the number of pixels in a feed direction of a paper sheet is extended for image data of the image;

correcting a density of at least one extended pixel of the plurality of extended pixels based on a change in a density of the plurality of extended pixels in the extended image data in the feed direction of the paper sheet or a change in a density of a plurality of pixels in the image data before being extended in the feed direction of the paper sheet;

printing the image on the paper sheet by the thermal head based on the extended image data in which the density of the at least one extended pixel is corrected; and analyzing the change in the density of the plurality of pixels in the image data before being extended in the feed direction of the paper sheet, wherein the generating the extended image data includes extending the number of pixels in the image data in the feed direction of the paper sheet to the number of extended pixels determined based on an analysis result of the change in the density of the plurality of pixels in the image data before being extended, thereby generating the extended image data.

2. The thermal printer according to claim 1, wherein the processes performed by the processor further includes analyzing the change in the density of the plurality of extended pixels in the extended image data in the feed direction of the paper sheet, or analyzing the change in the density of the plurality of pixels in the image data before being extended in the feed direction of the paper sheet, the analyzing the change in the density of the plurality of extended pixels includes comparing, of the plurality of extended pixels, a density of one extended pixel and a density of an extended pixel located in front or back of the one extended pixel in the feed direction of the paper sheet, and the analyzing the change in the density of the plurality of pixels incudes comparing, of the plurality of pixels, a density of one pixel and a density of a pixel located in front or back of the one pixel in the feed direction of the paper sheet.

3. A printing method of printing an image on a paper sheet by a thermal head, comprising steps of:

generating extended image data having a plurality of extended pixels in which the number of pixels in a feed direction of a paper sheet is extended for image data of the image;

correcting a density of at least one extended pixel of the plurality of extended pixels based on a change in a density of the plurality of extended pixels in the extended image data in the feed direction of the paper sheet or a change in a density of a plurality of pixels in the image data before being extended in the feed direction of the paper sheet;

printing the image on the paper sheet by the thermal head based on the extended image data in which the density of the at least one extended pixel is corrected; and analyzing the change in the density of the plurality of pixels in the image data before being extended in the feed direction of the paper sheet, wherein the generating the extended image data includes extending the number of pixels in the image data in the feed direction of the paper sheet to the number of extended pixels determined based on an analysis result of the change in the density of the plurality of pixels in the image data before being extended, thereby generating the extended image data.

* * * * *